United States Patent Office 3,246,336
Patented Apr. 12, 1966

3,246,336
MOLASSES FEED BLOCKS AND METHOD OF PREPARATION AND USE
Lester E. Baribo, Marvin W. Porter, Almerin Willard Turner, and Kenneth N. Wright, Decatur, Ill., assignors to A. E. Staley Manufacturing Company, Decatur, Ill., a corporation of Delaware
No Drawing. Filed Apr. 8, 1963, Ser. No. 271,471
11 Claims. (Cl. 99—6)

Our invention relates to animal feed blocks. More particularly, our invention relates to an animal feed in block form containing a high percentage of molasses.

The value of feeding molasses to livestock is well-recognized. In animal nutrition, molasses not only serves as an important source of sugar but also serves as a mild laxative and general digestive aid. Molasses is especially valuable as a portion of the diet of ruminants since it furnishes a supply of fermentable carbohydrate for the development and maintenance of intestinal microflora, particularly in the rumen which permits the ruminant to obtain utilization of highly cellulosic roughages. In spite of the nutritional advantages of molasses as an animal feed, certain drawbacks have restricted the use of feeds containing a high percentage of molasses. A primary restriction is the high palatability of the molasses itself which causes animals to consume excessive amounts exceeding the point of most efficient feed utilization. Also, because it has not heretofore been possible to produce a molasses feed block containing a high percentage of molasses, which would withstand weathering without molding, no form of feed containing a high percentage of molasses has been available which could be conveniently and economically fed in the pasture or open range. Blocks as a form of feed offer advantages over other forms of feed. Among these advantages are: (1) ease of handling and storage, (2) elimination of day to day feeding, (3) savings in feed as wind does not blow feed away, (4) can be fed in open range or pasture without cover, (5) helps control the rate of consumption due to the necessity for the animal to lick or gnaw the block.

It is an object of the present invention to provide a new and improved animal feed in block form containing a high percentage of molasses which will be consumed in proper quantities by livestock.

A further object of the present invention is to provide a feeding block containing a high percentage of molasses which is resistant to weathering and can remain in useable form in the open for extended periods of time.

A still further object of the invention is to provide in a controlled manner a source of fermentable carbohydrates for ruminants.

Other objects of the invention will become apparent from the description that follows.

The feeding blocks of our invention are made by compressing into block form a mixture of dehydrated molasses, sodium chloride, hereinafter referred to as salt, and a wet binder. The block should contain an amount of molasses (molasses equivalent) of not less than 50%. For the purpose of this invention, the term "molasses equivalent" is defined as "the weight percent of molasses present on a wet substance basis in a given material." Wet molasses normally consists of approximately 27% moisture and 73% solids although these percentages can vary. For illustration, 100 pounds of a feed containing 50 pounds of wet molasses and 50 pounds of filler material would contain a molasses equivalent of 50%. On the other hand, a feed containing 50 pounds of molasses dry solids and 50 pounds filler material would normally contain a molasses equivalent of approximately 68%.

The blocks of our invention are formed by compressing a mixture of the above-named materials into a solid, dense mass. As distinguished from pellets, which are small in size, blocks ordinarily are on the order of 9" x 9" x 12". However, the blocks of our invention can be any suitable size or shape. Such blocks are resistant to weathering and normal handling conditions. The blocks are designed for "free-choice" feeding. Thus, they can be placed in the open without cover where they can be easily reached by animals as they feed. Because of their resistance to weathering, the feed blocks of our invention can be put out in sufficient numbers so as to provide animals with several days or even weeks of feeding.

The principal reason for the inclusion of salt in our feed blocks is to control the consumption of the block. In feeding cattle, it is generally desirable for the individual animal to consume, on a daily basis, about 0.5 to 1.0 ounce of our block per 100 pounds of body weight. Thus, a 1000-pound animal should consume approximately ½ pound of block daily. It has been deemed uneconomical for an animal to consume over one pound of block per day. Generally, consumption within the desired range is obtained when the block contains from about 5 to 40% by weight of salt based on the weight of the block. Although blocks containing as high as 40% salt possess satisfactory weathering properties, optimum weathering properties are obtained when the block contains no more than 20% salt. If it would be desirable from a nutritional standpoint to not incorporate salt in the block, a block having satisfactory weathering properties containing no added salt can be produced in accordance with our process merely by eliminating salt as an ingredient.

Especially suitable wet binders which can be utilized in preparing our new feed blocks are wet molasses and corn steep liquor. Water can also be added in our process in place of wet molasses or corn steep liquor. Added water serves to extract a portion of molasses from the dehydrated molasses. Thus, it is extracted wet molasses and not water which serves as the wet binder when added water is utilized. Because of its excellent bonding qualities and also because its inclusion increases the amount of molasses in the final block, it is preferable to utilize added wet molasses as the wet binder in preparing the feed blocks of our invention.

The amount of wet binder necessary in preparing the feeding blocks of our invention will vary, depending among other things, on the particular wet binder utilized and the amount of residual moisture in the dry ingredients. For example, many dehydrated molasses products will contain small amounts on the order of 1–3% of residual moisture. Generally speaking, blocks having good weathering properties can be easily prepared when amounts of wet binder as low as 3–5% and as high as 12–15% are utilized. When wet molasses is the wet binder, it is preferable under most circumstances, to utilize from about 5 to about 12% by weight of wet molasses, the weight based on the weight of the block. When water is utilized, satisfactory results can often be obtained when as low as 2–3% added water is utilized as the wet binder. When such small amounts of water are utilized however, the blocks formed tend to be more brittle than those prepared with larger amounts of water and thus are less resistant to breakage during handling.

Since only a minor portion of the molasses needed to give a product of high molasses content is supplied by wet molasses when it is used as the wet binder, it is apparent that, in order to insure a final product with a molasses equivalent of no less than 50%, the major portion of molasses employed to make the block must always be dehydrated molasses. For example, when 12% molasses equivalent is supplied by wet molasses, a minimum of 38% molasses equivalent must be obtained from dehydrated molasses. As previously indicated, the term "dehydrated molasses" does not signify that no moisture is present in the dehydrated product. Most dehydrated products contain small amounts of residual moisture.

Many processes are known for preparing dehydrated molasses. U.S. Patent 2,912,331 describes a process for impregnating a carrier, specifically soybean millfeed, with wet molasses and then drying the product to give a free-flowing dehydrated molasses. A commercial product produced by this method contains approximately 85–90% molasses equivalent and about 2 to 3% moisture. U.S. Patent 2,377,360 shows the preparation of dehydrated molasses from wet molasses using alfalfa. Other materials such as pulverized barley hulls, pulverized straw, pulverized corn bran, pulverized corn cobs, soybean meal, corn oil meal and cotton seed meal, are known to the art as carriers in the production of dehydrated molasses. Other processes for producing dehydrated molasses are disclosed in U.S. Patents 2,991,179 and 2,556,111.

Any suitable type of molasses is satisfactory for use in forming the dehydrated molasses product used in our feed blocks. For example, feeding cane molasses, hydrol, feeding beet molasses, feeding corn sugar molasses, and feeding citrus molasses are each suitable. Generally, because of its high sugar content and pleasant flavor and aroma, it is preferable to utilize cane molasses. Cane molasses and beet molasses each contain a minimum of 48% total sugars by weight. Citrus molasses and corn sugar molasses, even though they contain at least 45% and at least 43% total sugars, respectively, are also satisfactory for use in our feed blocks.

Although the incorporation of small amounts of an edible fat or edible mineral oil in our feed blocks is not necessary, its preferable to use fat or mineral oil in preparing our blocks. Small amounts of edible fat or mineral oil on the order of 1–4% improve the weathering properties of the block and also aid in the production of the block by reducing the tendency of the block to stick to block pressing equipment. Suitable edible fats which can be employed include corn oil, soybean oil, hydrogenated animal fat, tallow, yellow grease, acidulated soapstock, etc., and the like.

Proteins, minerals, vitamins and other nutritional supplements of value to animals may be incorporated into our feed blocks, if so desired, provided, of course, the previously stated minimum equivalents of molasses and amounts of salt are present in the final block. Our blocks, because of their palatability, are especially suitable as carriers for distasteful feed additives and in addition, provide an easy means for controlling the consumption of feed additives. Distasteful feed supplements or pesticidal compositions, such as phenothiazine, sodium propionate and calcium propionate can be incorporated in our feed blocks without adversely affecting the consumption of the blocks. Specifically, the inclusion of small amounts of phenothiazine on the order of 0.5 to 1.0% by weight based on the weight of the block, acts as a worming agent and serves to effectively control horn flies in cattle. Antibloat additives such as dimethylpolysiloxene can also be incorporated in effective amounts into our feed blocks. Protein can be included in the block without the addition of a protein supplement simply by utilizing a protein containing carrier such as cotton seed meal, soybean meal or corn oil meal as the carrier for the dehydrated molasses.

Broadly stated, feed blocks made according to this invention are prepared by compressing a mixture of dehydrated molasses, salt and a wet binder into a block with the final product containing at least 50% molasses on an equivalent basis and containing from 5 to 40% by weight of salt, the weight based on the weight of the block. Although it is not essential to mix the ingredients in any particular manner or order, the following procedure has been found convenient:

The dry ingredients, i.e. dehydrated molasses, salt and any other dry additive utilized are first thoroughly mixed. The wet binder and edible fat are then individually but simultaneously blended into this mixture to give a final mixture ready for pressing. Blocks can be formed from such mixtures by any conventional means. Preferably, the blocks are formed immediately after the mixtures are prepared. Standard block-making equipment used to produce animal feed blocks (protein or mineral blocks, for example), are suitable for producing the blocks of our invention. Such block-making machines, usually press blocks at pressures of approximately 1500–3000 pounds per square inch. A dry solid block is obtained by this process for the moisture added in the form of wet binder is mainly taken up by the dehydrated molasses in the formation of the block.

Typical feed blocks of the invention can be prepared from the following general formula:

| | Percent by weight |
|---|---|
| Dehydrated molasses impregnated on soybean millfeed having molasses equivalent of approximately 87% | 70–77 |
| Salt | 15–23 |
| Wet molasses | 7–9 |
| Animal fat | 1–4 |

A further understanding of our invention will be obtained from the specific examples that follow. These examples are not intended, however, to limit the invention.

*Example I*

Feeding blocks were pressed from the following mixture at about 2500 lbs./sq. inch in a Johnson feed block press, manufactured by the A. E. Johnson Company of Elgin, Texas.

| | Percent by weight |
|---|---|
| Dehydrated molasses impregnated on soybean millfeed made according to the process described in U.S. Patent 2,912,331 and having a molasses equivalent of 87% | 75.5 |
| Wet molasses | 8.0 |
| Animal fat | 1.0 |
| Salt | 15.0 |
| Trace minerals | 0.5 |

Large numbers of these blocks were placed in the open on a feed lot containing 42 head of two-year old fattening steers weighing on the average of 1150 pounds per head. The animals were under full feed. At the end of seven days, it was calculated that the animals consumed approximately 0.5 pound of block per head per day. At the end of the seven-day period, unconsumed blocks showed no adverse weathering effects.

*Example II*

Feeding blocks were pressed from the following mixture at approximately 2500 lbs./sq. inch in a Johnson feed block press.

| | Percent by weight |
|---|---|
| Dehydrated molasses impregnated on soybean millfeed made according to the process described in U.S. Patent 2,912,331 and having a molasses equivalent of 87% | 70.5 |
| Wet molasses | 8.0 |
| Animal fat | 1.0 |
| Salt | 20.0 |
| Trace minerals | 0.5 |

A large number of the blocks were placed uncovered in feed bunks in open pasture where 25 yearling heifers were feeding. Over a 21-day feeding period, the animals consumed approximately 0.4 lb. of block per head per day. At the end of the period, the unconsumed blocks were examined and were found to be in good condition in spite of the fact that rain had occurred during the feeding period.

The results shown in Examples I and II demonstrate the weathering qualities of our blocks and their effectiveness in controlling the consumption of molasses.

Example III

Blocks similar to those described in Examples I and II containing amounts of salt ranging from 10% to 30% were fed to steers, heifers and yearlings under various feeding conditions. Consumption results similar to those shown in Examples I and II were obtained.

Example IV

To test the effectiveness of phenothiazine when incorporated in our feed block in controlling horn flies and in showing the acceptability of our feed blocks containing phenothiazine, the following test was conducted: Blocks pressed from a mixture having the following formula were made available to 45 head of cattle having an average weight of 850 lbs. for 93 days.

| | Percent by Weight |
|---|---|
| Dehydrated molasses impregnated on soybean millfeed having a molasses equivalent of 87% | 69.6 |
| Wet molasses | 8.0 |
| Salt | 20.0 |
| Animal fat | 1.0 |
| Trace minerals | 0.5 |
| Phenothiazine | 0.9 |

During the 93-day period, approximately ¼ pound of block per head per day was consumed. Droppings from these animals were collected and were placed in fly culture jars for incubation of horn flies. No horn flies developed in the samples. A second group of 41 cattle, to which no phenothiazine was made available, was fed during the same 93-day period on the same farm. Droppings from the second group of cattle were collected and placed in fly culture jars. Numerous horn flies developed in these samples.

Since many embodiments of this invention may be made and since many changes may be made in the embodiments described, the foregoing is to be interpreted as illustrative only and our invention is defined by the claims appended hereafter.

We claim:

1. An animal feed block characterized by its resistance to weathering comprising from about 5 to about 40% sodium chloride by weight, based on the weight of the block, and dehydrated molasses, the whole being bonded by a wet binder, the equivalent amount of molasses in the block being not less than 50%.

2. An animal feed block characterized by its resistance to weathering comprising from about 5 to about 40% by weight sodium chloride, from about 1 to about 4% by weight of a material selected from the group consisting of edible mineral oil and edible fat, the weights based on the weight of the block, and dehydrated molasses, the whole being bonded by a wet binder, the equivalent amount of molasses in the block being not less than 50%.

3. The article of claim 2 wherein the wet binder is wet molasses.

4. The article of claim 2 wherein the wet binder is corn steep liquor.

5. The article of claim 2 wherein the amount of salt ranges from about 5 to about 20%.

6. An animal feed in block form characterized by its resistance to weathering comprising from about 15 to about 23% by weight sodium chloride, from about 70 to about 77% by weight dehydrated molasses, the said dehydrated molasses having a molasses equivalent ranging from about 85 to about 90%, and from about 1 to about 4% by weight edible fat, the whole being bonded by from about 5 to about 12% by weight of a wet binder, all weight being based on the weight of the block.

7. The article of claim 6 wherein the amount of wet binder ranges from about 7 to about 9%.

8. The article of claim 7 wherein the wet binder is wet molasses.

9. A palatable animal feed block characterized by its resistance to weathering comprising from about 5 to about 40% by weight sodium chloride, from about 1 to about 4% by weight of a material selected from the group consisting of edible mineral oil and edible fat, dehydrated molasses and a horn fly controlling amount of phenothiazine, the whole being bonded by a wet binder, the equivalent amount of molasses in the block being not less than 50%.

10. A method for preparing an animal feed having a molasses equivalent of not less than 50% and characterized by its resistance to weathering which comprises compressing in block form a mixture of molasses in a concentration sufficient to provide a molasses equivalent of not less than 50% comprising dehydrated molasses, from about 5 to about 40% by weight sodium chloride, from about 5 to about 12% by weight of a wet binder to form a block, all of said weight being based on the weight of the block.

11. A method for controlling the consumption of molasses in cattle to a level not in excess of one pound per day which comprises feeding cattle an animal feed block comprising from about 5 to about 40% by weight sodium chloride and dehydrated molasses, bonded by a wet binder, the equivalent amount of molasses in the block being not less than 50%.

References Cited by the Examiner

UNITED STATES PATENTS 1,638,963   8/1927   Schreiber _____ 99—6

FOREIGN PATENTS 624,812   8/1961   Canada.
297,235   9/1928   Great Britain.

A. LOUIS MONACELL, *Primary Examiner.*